May 19, 1931.  B. B. FELIX  1,805,576
CUSHION STRIP
Original Filed Sept. 24, 1926
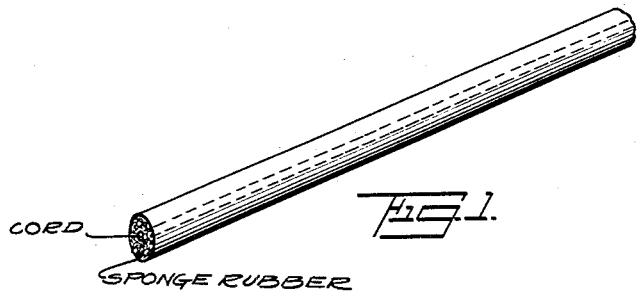
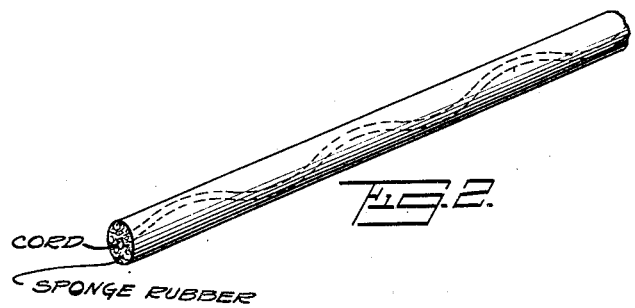
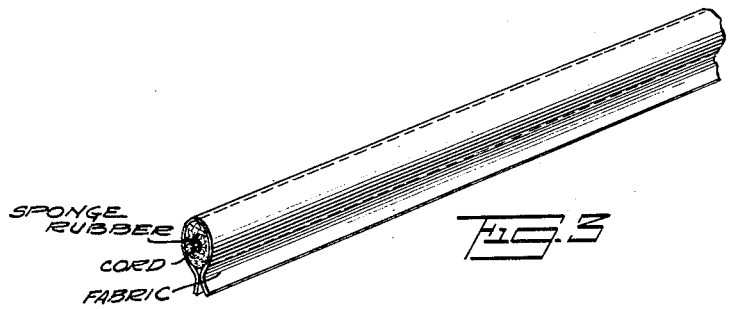
INVENTOR
BENJAMIN B. FELIX.
BY
ATTORNEYS Patented May 19, 1931

1,805,576

UNITED STATES PATENT OFFICE

BENJAMIN B. FELIX, OF CHICAGO, ILLINOIS

CUSHIONING STRIP

Application filed September 24, 1926, Serial No. 137,609. Renewed October 11, 1929.

Sponge rubber, particularly when made up in the form of long strips, is valuable in many different fields as a cushioning pad, but in some instances the use of the material for this purpose is impractical, due to the fact that a relatively small strip of sponge rubber stretches very easily, making it difficult to apply evenly. Again it is possible to produce sponge rubber strips with a fabric cover, cured integral with the rubber, in which case if the fabric is not strong, a stretch given to the rubber will tear the fabric.

I have found that products of great value can be produced if sponge rubber is molded in the form of a strip with a substantially inextensible cord running through it. The cord will prevent the strip from being stretched lengthwise, but can be made relatively small in diameter so that it does not in any way affect the use of the material for cushioning purposes. If it is desired to permit a limited amount of stretch in the rubber and make it substantially impossible for the material to stretch beyond such limit, the cord may be imbedded in waves through the body of the material.

In the accompanying drawings, I illustrate three forms of my invention. Fig. 1 shows a substantially round strip of sponge rubber with a cord running straight through the center; Fig. 2 shows a similar strip with a cord laid in waves, and Fig. 3 shows a strip of sponge rubber covered with fabric. Ordinarily the cord will be made to run straight through the cushion, but if an elastic covering fabric like knit goods is used, the cord may be inserted as shown in Fig. 2.

It is to be understood that the strips may be made in many shapes besides the round form shown. The cord should be made of fibrous material such as cotton, wool or silk.

What I claim is:

A cushioning strip comprising a length of readily compressible material and a substantially inextensible longitudinal cord imbedded therein in a non-straight line whereby the strip may be stretched to the point where such inextensible cord is in the form of a straight line.

BENJAMIN B. FELIX.